(12) United States Patent
Poliwoda et al.

(10) Patent No.: US 11,113,834 B2
(45) Date of Patent: Sep. 7, 2021

(54) COMPUTER-IMPLEMENTED METHOD FOR DETERMINING A LOCAL DEVIATION OF A GEOMETRY OF AN OBJECT FROM A TARGET GEOMETRY OF THE OBJECT

(71) Applicant: Volume Graphics GmbH, Heidelberg (DE)

(72) Inventors: Christoph Poliwoda, Mannheim (DE); Thomas Gunther, Heidelberg (DE); Christof Reinhart, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 35 days.

(21) Appl. No.: 16/500,764

(22) PCT Filed: Apr. 13, 2018

(86) PCT No.: PCT/EP2018/059580
§ 371 (c)(1),
(2) Date: Oct. 3, 2019

(87) PCT Pub. No.: WO2018/206226
PCT Pub. Date: Nov. 15, 2018

(65) Prior Publication Data
US 2021/0118164 A1    Apr. 22, 2021

(30) Foreign Application Priority Data
May 12, 2017 (DE) .................... 10 2017 110 340.6

(51) Int. Cl.
*G06T 7/60* (2017.01)
*G06T 7/00* (2017.01)
(Continued)

(52) U.S. Cl.
CPC .............. *G06T 7/60* (2013.01); *G01B 15/025* (2013.01); *G01B 15/045* (2013.01); *G06T 7/001* (2013.01);
(Continued)

(58) Field of Classification Search
CPC .......... G06T 7/60; G06T 7/0006; G06T 7/73; G06T 7/001; G06T 2207/30164; G06T 2207/10081; G01B 15/045; G01B 15/025
See application file for complete search history.

(56) References Cited

U.S. PATENT DOCUMENTS

| | | | |
|---|---|---|---|
| 2015/0006126 A1 | 1/2015 | Taguchi et al. | |
| 2019/0184198 A1* | 6/2019 | Mori | G06T 7/248 |
| 2019/0310348 A1* | 10/2019 | Yamao | G06K 9/6215 |

FOREIGN PATENT DOCUMENTS

| | | |
|---|---|---|
| DE | 10 2005 032 687 A1 | 1/2007 |
| DE | 10 2013 104 490 A1 | 7/2014 |

OTHER PUBLICATIONS

Pavel Müller et al: "Computed tomography as a tool for tolerance verification of industrial parts", 12th CIRP Conference on Computer Aided Tolerancing, Hillerad, Denmark, 2013, pp. 125-132, XP055479516.

(Continued)

*Primary Examiner* — Siamak Harandi
(74) *Attorney, Agent, or Firm* — SoCal IP Law Group LLP; Angelo Gaz

(57) ABSTRACT

Described is determining a local deviation of a geometry of an object from a target geometry of the object on the basis of a digital representation of the object that comprises image information items that each specify a value of a measurand for the object at a defined position of the object. This includes determining the object representation, determining a distance field from the image information items of the object representation that comprises distance values for a
(Continued)

specific point of the distance field that specifies the shortest distance of the point from a closest material boundary of the geometry of the object, determining the target geometry of the object, and determining the local deviation of the geometry of the object from the target geometry of the object at a test point on a material boundary predefined by the target geometry.

12 Claims, 5 Drawing Sheets

(51) Int. Cl.
    *G06T 7/73*       (2017.01)
    *G01B 15/02*     (2006.01)
    *G01B 15/04*     (2006.01)

(52) U.S. Cl.
    CPC ............. *G06T 7/0006* (2013.01); *G06T 7/73* (2017.01); *G06T 2207/10081* (2013.01); *G06T 2207/30164* (2013.01)

(56) References Cited

OTHER PUBLICATIONS

Kruth, J P et al: "Computed tomography for dimensional metrology," CIRP Annals—Manufacturing Technology 60 (2011) pp. 821-842, XP028262022.
Reinhart et al: "Modern Voxel Based Data and Geometry Analysis Software Tools for Idustrial CT", Volume Graphics GmbH, Heidelberg, Germany, 2004, pp. 1-8.
Jones, Mark et al: "3D distance fields: a survey of techniques and applications", IEEE Transactions on Visualization and Computer Graphics, vol. 12, No. 4., Jul./Aug. 2006, pp. 581-599, XP002495660.
German Patent Office, Office Action for German Application No. 10 2017 110 340.6, dated Mar. 23, 2018.
Mohan, P et al, "Development of a Library of Feature Fitting Algorithms for CMMs", International Journal of Precision Engineering and Manufacturing vol. 16, No. 10, pp. 2101-2113. Sep. 2015.
Gibson, S, "Using Distance Maps for Accurate Surface Representation in Sampled Volumes", Mitsubishi Electric Research Laboratories, Cambridge, MA, Dec. 1999. 10 pages.
European Patent Office, International Search Report and Written Opinion for PCT Application No. PCT/EP2018/059580, dated Jun. 8, 2018.

* cited by examiner a)

b)

COMPUTER-IMPLEMENTED METHOD FOR DETERMINING A LOCAL DEVIATION OF A GEOMETRY OF AN OBJECT FROM A TARGET GEOMETRY OF THE OBJECT

RELATED APPLICATION INFORMATION

This patent claims priority from International PCT Patent Application No. PCT/EP2018/059580, filed Apr. 13, 2018 entitled, "COMPUTER-IMPLEMENTED METHODS FOR DETERMINING A LOCAL DEVIATION OF A GEOMETRY OF AN OBJECT FROM A TARGET GEOMETRY OF THE OBJECT", which claims priority to German Patent Application No. 10 2017 110 340.6, filed May 12, 2017 all of which are incorporated herein by reference in their entirety.

BACKGROUND

FIELD

The invention relates to a computer-implemented method for determining a local deviation of a geometry of an object from a target geometry of the object from a digital representation of the object.

DESCRIPTION OF THE RELATED ART

Checking objects, in particular workpieces, with respect to the correspondence thereof to a desired target geometry is an omnipresent theme in the prior art. For example, it is thus to be continuously ensured in the course of workpiece testing that a workpiece created by a production process corresponds to the patterns on which the creation is based. In the past, in particular nondestructive methods have proven to be of particular interest for analyzing workpieces. For example, by way of an analysis of a workpiece by a magnetic resonance tomography method, undercuts and internal geometries of the object can also be ascertained without the object having to be cut open.

One routine method for determining local deviations of a geometry of an object from a target geometry of the object is to firstly determine the surface of the object and subsequently to compare the ascertained surface to a target geometry of the object. For this purpose, it can be determined point by point how far the target geometry is spaced apart from the object. However, firstly the relation of the location of the object to the location of the target geometry has to be determined for such a spacing determination. The spacing from a corresponding point of the object to be studied then has to be determined for each individual point of the target geometry. This is cumbersome and frequently results in a high processing load.

SUMMARY

In contrast, the present invention is based on the object of overcoming the above-mentioned disadvantages of the prior art and providing an improved method for determining local deviations of the geometry of an object from its target geometry.

Main features of the invention are specified in this document and the corresponding figures.

In a first aspect, the invention relates to a computer-implemented method for determining a local deviation of a geometry of an object from a target geometry of the object from a digital representation of the object. The object representation comprises a plurality of items of image information of the object in this case, wherein an item of image information indicates a value of a measured variable for the object at a defined position of the object. The method comprises the following steps in this case. Firstly, the object representation is ascertained. Subsequently, a distance field is ascertained from the items of image information of the object representation, wherein the distance field comprises a plurality of distance values. A distance value indicates in this case for a specific point of the distance field the shortest distance of the point to a closest material boundary surface of the geometry of the object. Subsequently, the target geometry of the object is ascertained and registered to the material boundary surfaces of the geometry of the object specified by the distance values. Finally, the local deviation of the geometry of the object from the target geometry of the object at a test point on a material boundary surface predetermined by the target geometry is ascertained by reading out the distance value of the distance field at the position of the test point.

The above-described method has the advantage in this case that for individual points on the surface of the target geometry, the distance value read out from the distance field provides direct information about the local deviation of the geometry of the object from the target geometry of the object. It is therefore no longer necessary to ascertain the distance between a point of the target geometry and a corresponding point on the actual geometry of the object separately. In this case, the representation of the object by the distance field is preferably used as the sole object representation. In this case, the information of the distance field used in any case for the representation of the object can also be used simultaneously to determine deviations from a target geometry.

In this case, the distance field can code the location of a material boundary surface in essentially two ways. In a first approach, a distance value of the distance field merely reflects the absolute value of the distance of a corresponding point of the distance field from the closest material boundary surface. However, in this case it is not yet clear solely by way of the distance information at a point of the distance field on which side of a material boundary surface the point is arranged. This information can additionally be coded in the distance field, however, by the distance values additionally being provided with a sign. Distance values of data points which are located on a first side of the material boundary surface are assigned a positive sign in this case, while data points on the second side of the material boundary surface are assigned a distance value having a negative sign. It can then be derived from the signs of a distance value of a data point, for example, whether a data point is located inside a geometry or a body, or outside. This additional information can be used for fitting the ascertained target geometry into the distance field.

Such a distance field having signed distance values is known in this case as a "signed distance field" (SDF). In this case, an unsigned distance field can be converted according to one embodiment into a signed distance field by adapting the distance values in such a way that the absolute value thereof remains unchanged, but the gradient of the entire distance field is equal to 1 at every point, however.

An "object" in the meaning of the invention can be any arbitrary object which can be represented by a digital representation in such a way that the material boundary surfaces of the object are definable. For example, an object can be a workpiece made of metal.

This object can be represented digitally in any arbitrary manner. For example, the digital representation can be provided in the form of an image of the object after an examination by a magnetic resonance tomograph. In this case, the items of image information of the object would represent the local relaxation times of an atomic spin at a specific position of the object. The nature of the material at the position of a measurement point could be concluded, for example, from such a relaxation time.

The ascertainment of the object representation can take place in various ways in this case. In the above-mentioned example, the object representation can be generated by a measurement of the object by means of a magnetic resonance tomograph. However, it is also entirely possible that the object representation is retrieved from a storage medium, whereby a measurement previously carried out or another type of representation of an object is utilized.

Similarly, the ascertainment of the target geometry of the object can also take place in that a storage medium is read out, which contains items of information which are associated with the represented object.

According to one embodiment, the distance field can comprise a continuous profile of the distance values in the form of a scalar field. In this manner, the respective distance value could be read out in a simple manner from the distance field for an arbitrary point in space. However, other options are also entirely conceivable for how a distance field can be implemented. These will also be discussed hereafter.

For the registration of the target geometry of the object on the material boundary surfaces of the geometry of the object specified by the distance values, for example, a simple overlay of the target geometry with the geometry of the object could be achieved, for example, from the knowledge of the location of the imaged object in an imaging system.

According to one embodiment, for example, to register the target geometry of the object on the material boundary surfaces of the geometry of the object specified by the distance values, the target geometry of the object can be adapted by applying a fit method in the distance field. In this case, exclusively the distance values of the distance field are preferably used for fitting the target geometry. A repeated ascertainment of the location of the material boundary surfaces from the items of information of the distance field is not necessary in this case. This has the advantage that the location of the represented object in an imaging system does not have to be known beforehand. Rather, the target geometry can be brought into superposition with the object for an arbitrary location of the object in the digital representation. This enhances the flexibility of the method according to the invention.

According to a further embodiment, the target geometry of the object can be fitted by application of the method of least-squares and/or a minimum zone fit and/or by fitting the target geometry as an inscribed and/or circumscribed figure in the distance field as a fit method. In this case, the different approaches for fitting the target geometry of the object have different advantages, which are advantageous for various situations. For example, the fitting of the target geometry as an inscribed and/or circumscribed figure is reasonable if the maximum or minimum diameter or distance is to be determined for a specific geometry of the examined object. This can be necessary, for example, in the field of bolts or bores or other protruding or extruded geometries.

It is essentially possible to differentiate according to two application scenarios in this case in the fitting of the target geometry. In a first application scenario, the geometry of an object is to be compared to an exact target geometry including corresponding dimensions. In this case, for example, a Gaussian fit is reasonable, since the dimensions of the target geometry are defined. A fitting as an inscribed or circumscribed geometry is not reasonable in this case. In a second scenario, a comparison of a geometry to a shape of the target geometry can be provided, in which the dimensioning of the target geometry initially does not play a role. For example, it can thus be checked whether an object designed as a round body, for example, is also actually round. In this case, a fit of a target geometry as an inscribed or circumscribed figure can also be reasonable.

According to a further embodiment, an ascertained local deviation of the geometry of the object from the target geometry can be output by a false color representation, which significantly facilitates the recognition of deviations for a user.

According to a further embodiment, the distance field comprises a plurality of data points arranged in a raster, wherein the distance field assigns at least one distance value for the position of the data point to each of the data points. This has the advantage over the above-described continuous distance field, which contains the respective distance value for each point in space, that the distance value only has to be ascertained for selected data points. The effort for determining the distance field is thus significantly reduced. Because of the general linearity of such a distance field, from the knowledge of the relative location of the data points in relation to one another in this case, a corresponding distance value in an intermediate space between the data points can be ascertained from the distance values of adjacent data points. Therefore, the local distance value of the distance field can also be established at any arbitrary position on the surface of a fitted target geometry in the case of a rasterized distance field, so that the local deviation can be ascertained by simply reading out the distance field.

The above-described ascertainment of distance values in an intermediate space between data points is greatly simplified in particular if the raster of the distance field is an orthogonal and/or isotropic grid. A grid is precisely orthogonal in this case if the connections between adjacent data points of the grid are always in parallel or perpendicular in relation to one another. An isotropic grid is provided if the grid is constructed identically in every direction of the grid. In the case of such a grid, the relative location of the data points in relation to one another is always constant for the entire grid, so that distance values between the data points can be back calculated using a simple calculation rule from the distance values of individual data points. Therefore, in this case the determination of the distance value from arbitrary points of a surface of a target geometry is simplified once again.

As was already stated above, the core concept of the present invention is based on a local deviation of a target geometry from the geometry of a represented object being read out directly from the distance field of the material boundary surfaces of the object. According to one embodiment, the following procedure can be used in this case to ascertain the distance field. Firstly, the location of material boundary surfaces of the object is ascertained from the items of image information of the object representation. A variety of solutions are known for this purpose from the prior art, which will not be discussed in detail here. Subsequently, for one data point of the plurality of data points of the distance field, a material boundary surface closest to the data point is ascertained. Proceeding from the ascertained closest material boundary surface, the respective distance of the data point or the data points of the distance field from the respective closest material boundary surface is ascertained and the respective ascertained distance is assigned to the respective data points as a distance value. Under the assumption of a determined accuracy of the ascertainment of the location of the material boundary surfaces, the representation of the material boundary surfaces on the basis of the distance field is also accordingly accurate in this case, so that no information loss occurs due to the representation of a material boundary surface by a distance field. The above-described method sequence for ascertaining a distance field represents a simple option for ascertaining such a distance field in this case.

The ascertainment of the target geometry of the object can be performed according to one embodiment in that the target geometry is predetermined by a user input. For this purpose, for example, the digital representation of the object can be presented to a user, wherein the user can select a variety of basic shapes and then assign them to corresponding regions of the represented object.

Furthermore, it can be provided according to a further embodiment that the target geometry is ascertained from a CAD file, which was used, for example, for controlling a CNC machine during the production of the examined object. In this case, a good, direct comparison between the dimensions and/or the geometry of the represented object and the actual structure and/or geometry of the object to be achieved is possible on the basis of the CAD file.

In an alternative approach thereto, it is provided according to one embodiment that the target geometry of the object to be fitted into the distance field is ascertained from the distance field itself. It can be provided for this purpose, for example, that an analysis program successively fits various basic bodies, for example, cubes, cylinders, or the like, or also free-form surfaces, into the distance field. It can then be ascertained for the individual fitted geometries, for example, on the basis of a chi-square test, whether the fitted bodies correspond to the material boundary surfaces coded by the distance field with sufficient accuracy. The selection of the target geometry to be fitted can take place by selecting the geometry for which the best fit result was achieved on the basis of the chi-square. In this case, it can be checked by a target-actual comparison, for example, whether the geometry of the represented object coded by the distance field corresponds to a determined target geometry. As a specific example, it could be checked, for example, whether an actually round geometry is in fact round. The deviations of the examined geometry from the target geometry can then in turn be represented in false colors, so that a user can recognize rapidly at which points of the represented object deviations from the target geometry exist.

The automatic selection of the target geometry from the values of the distance field itself has the advantage that the analysis and measurement of the object represented by the digital representation can take place completely automatically. Only the probably existing geometric basic shapes have to be specified at the beginning of the examination of the object. The exact analysis and/or fitting and local assignment of the geometries to be fitted can then be performed by the analysis program itself.

According to one preferred embodiment, the object representation is a rastered representation of the object, wherein the rastered representation comprises a plurality of measurement points of a measurement of the object arranged in a raster. A measurement point then comprises at least one item of image information. Any arbitrary grid can be used in this case for rastering the representation of the object. In this case, this is preferably a regular grid to ensure a homogeneous representation of the object. According to a further embodiment, the measurement is a computer tomography measurement, wherein the image information of a pixel indicates the x-ray density of the material of the object at the point of the pixel. Computer tomography is a preferred method for nondestructive examination of workpieces in this case, since it is capable of imaging the geometry of an object at a very high resolution.

In a further aspect, the invention relates to a computer program product having instructions executable on a computer, which instructions, when executed on a computer, cause the computer to carry out the method according to any one of the preceding claims.

Further features, details, and advantages of the invention result from the wording of the claims and from the following description of exemplary embodiments on the basis of the drawings. In the figures:

Similar or identical features are identified hereafter using the same reference signs.

DETAILED DESCRIPTION

Figure 1:
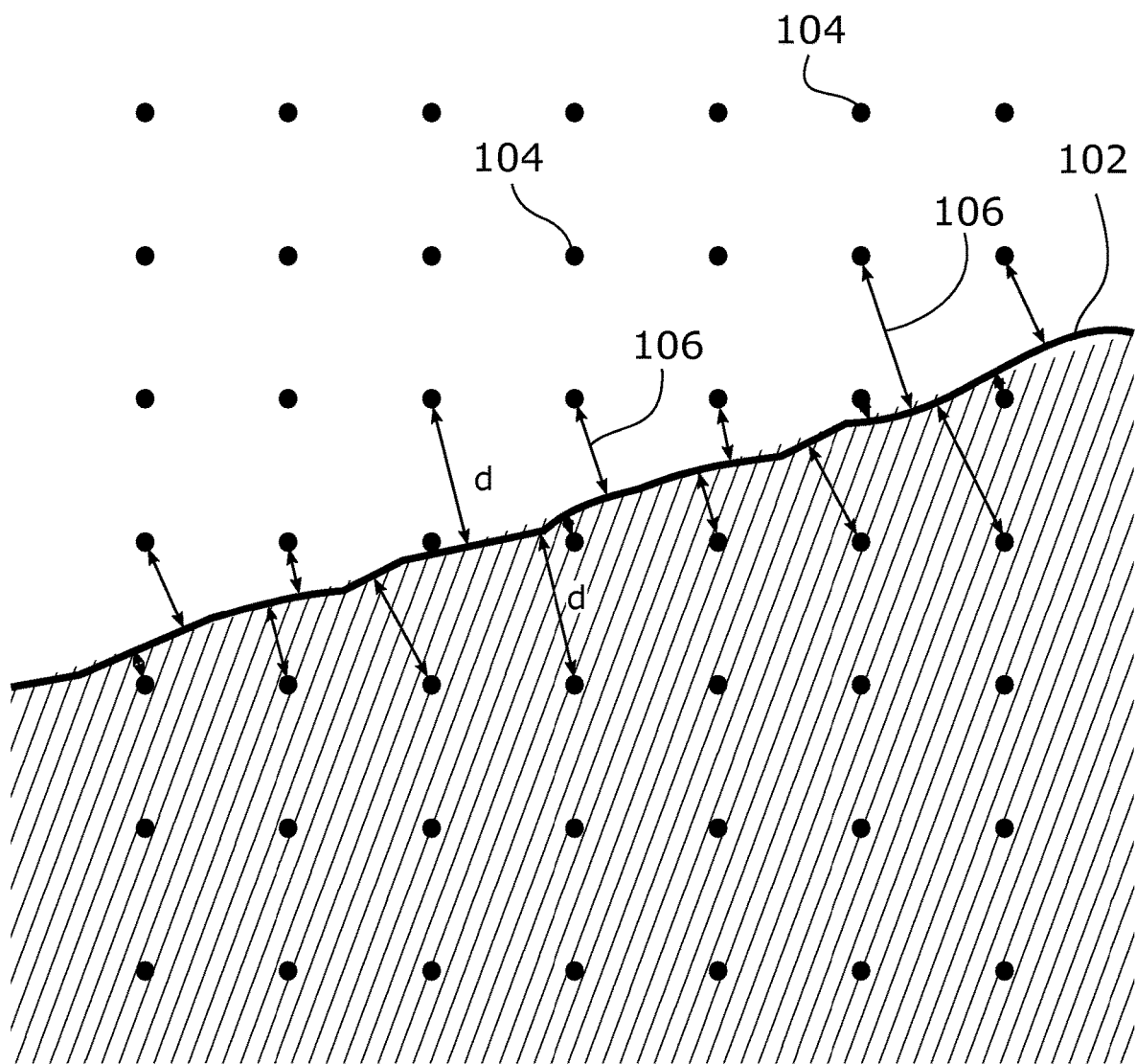
FIG. 1 shows a schematic illustration of an object having an overlaid distance field.

FIG. 1 shows a schematic illustration of a detail of an object representation having a distance field overlaid on the object representation. The object representation or the represented object is essentially characterized in this case by the material boundary surface 102, which extends diagonally through the image detail. The material boundary surface 102 denotes the transition at which a first material of the represented object merges into a second material of the represented object or into the air surrounding the object. Thus, for example, air can be present in the region shown white, while the represented object consists of metal in the region shown shaded. As can be seen well in FIG. 1, the material boundary surface 102 is not uniformly linear, but rather has small local irregularities. However, these are shown exaggerated in FIG. 1.

The distance field overlaid on the object representation is essentially illustrated by a plurality of data points 104. The data points 104 are arranged in this case in a regular, square, isotropic grid. Although a two-dimensional representation is shown in FIG. 1, the illustrated situation can be readily transferred to a three-dimensional representation of the object. In this case, the data points 104 are arranged, for example, in a cubic grid.

As already stated above, a distance field assigns a distance value to each of the data points 104, which describes the shortest distance of a data point 104 to a respective material boundary surface 102 closest to the data point 104. To illustrate this, for all of the data points 104 which are arranged directly adjacent to the material boundary surface 102, the connection vectors 106 to the closest material boundary surface 102 are shown in each case in FIG. 1. The condition that the shortest connection between the data point 104 and material boundary surface 102 is used as the distance value is ensured in this case in that the connection vectors 106 are generally perpendicular to the material boundary surface 102. As a result, the individual connection vectors 106 for the different data points 104 are generally primarily not parallel. If the material boundary surface 102 were exactly linear without the illustrated irregularities, however, the connection vectors 106 would be aligned in parallel to one another.

The distance value which is assigned to a data point 104 corresponds in this case to the absolute value of the connection vector 106 of a data point 104 or its length, respectively. The distance value is abbreviated by way of example by the letter d in FIG. 1. An exact reconstruction of the material boundary surface 102 in the scope of the accuracy of the fundamental object representation is possible by way of the plurality of distance values d, which are assigned in the distance field to the plurality of data points 104. The material boundary surface 102 can therefore be coded completely by the distance field. If the location of the material boundary surface 102 has been ascertained in this case from the items of image information of the digital representation of the object with a defined accuracy, the representation of the material boundary surface 102 by the distance field is also correspondingly accurate.

Figure 2:
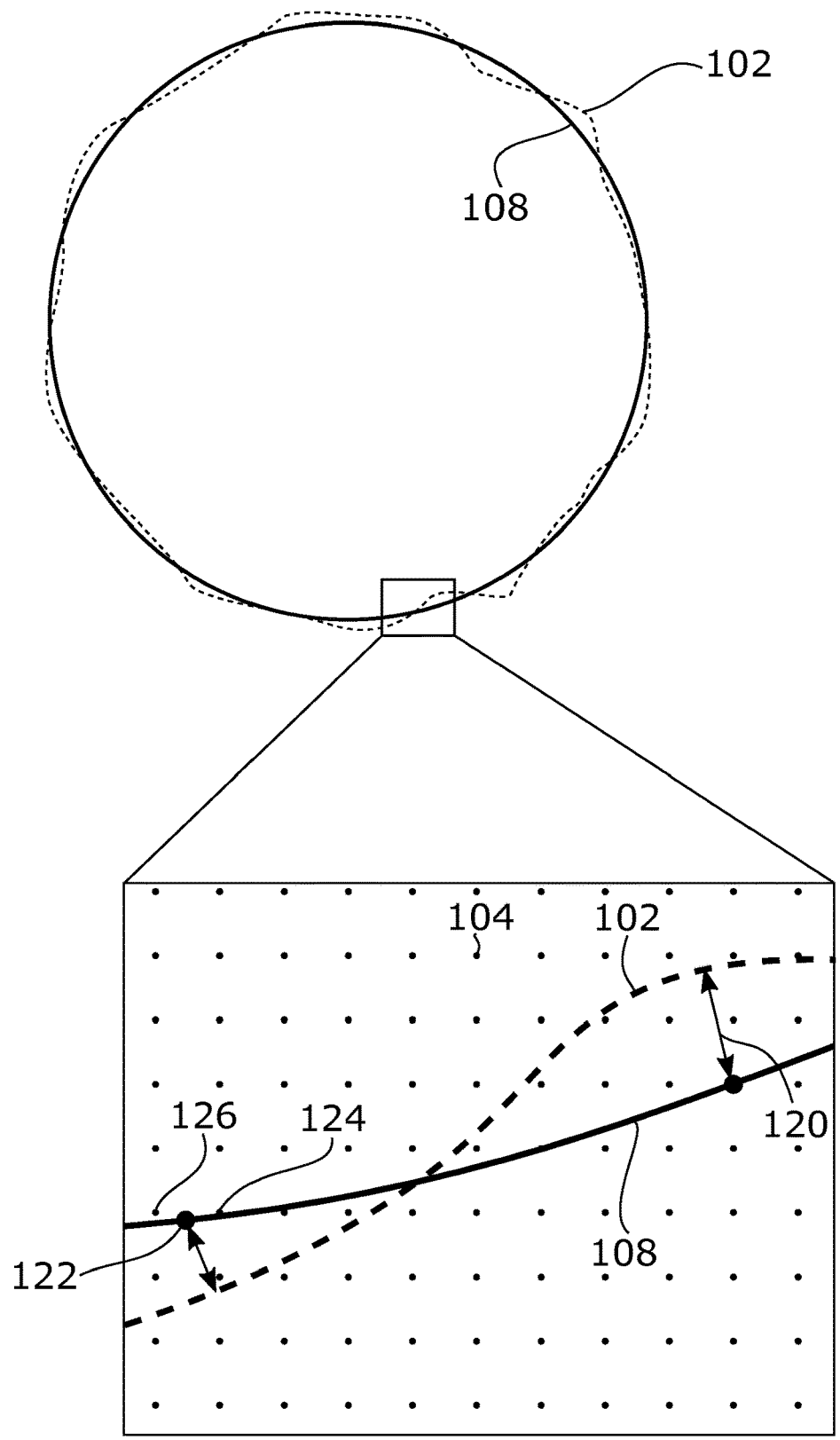
FIG. 2 shows a schematic illustration of a material boundary surface and an overlaid target geometry and a determination of the local deviation of the target geometry from the boundary surface.

FIG. 2 shows a schematic illustration of a substantially circular material boundary surface 102, which is shown by dashed lines. The material boundary surface 102 is overlaid in this case with a target geometry 108, which was fitted into the material boundary surface 102, for example, by the method of least squares. The target geometry 108 is shown in this case by a solid line. For example, the illustrated geometry can be a bore or a bolt, so that the geometry having a circular shape as the target geometry 108 is examined with respect to local deviation. The illustrated two-dimensional image is also readily transferable to the three-dimensional image. In this case, for example, the target geometry 108 is a cylinder.

The profile of the material boundary surface 102 is greatly exaggerated in its deviations from a target geometry 108 in FIG. 2, to better illustrate the described state of affairs.

An enlarged subsection is illustrated in a lower region of the illustrated geometry in FIG. 2. In the enlarged detail, in contrast to the top of FIG. 2, the distance field and/or the individual data points 104 of the distance field were shown. The distance field 104 is also a regular isotropic grid here, which is constructed from square individual cells. The distance value, i.e., the shortest spacing of the data point 104 to a closest material boundary surface 102 of the illustrated object, is again assigned to each of the individual data points 104.

To ascertain a local deviation of the geometry of the examined object, represented by the material boundary surface 102, from the target geometry 108, the local value of the distance field, i.e., the corresponding assigned distance value, can now be read out on an arbitrary position on the surface of the target geometry 108. For example, it is given for the point 120 that this surface point of the target geometry 108 is simultaneously coincident with a data point 104 of the distance field. Therefore, the local spacing of the target geometry 108 from the material boundary surface 102 of the object can be determined at this point in a simple manner. In a bottom left region of the detail, in contrast, a point on the surface 108 of the target geometry was selected which is arranged between the data points 104 of the distance field. Because of the linearity of the distance field and the regular arrangement of the data points 104 in the grid of the distance field, the value of the distance field at the position of the point 122 can be back calculated from the distance values of the adjacent data points 124 and 126. This is possible by simple trigonometric considerations, which are not described in detail here. A determination of the local deviation of the target geometry 108 from the material boundary surface 102 is therefore also possible with little effort for the intermediate region between the data points 124 and 126.

In summary, the representation of an object or a material boundary surface 102 of the object by a distance field enables a simple determination of a local deviation of the examined object from a target geometry 108 by reading out the values of the distance field.

In addition to the above-described fit of a target geometry 108 on the basis of the method of least-squares, it can also be reasonable in various situations to use other methods for fitting the target geometry into the material boundary surface 102 coded by the distance values. Two possible adaptation methods are shown for this purpose in FIG. 3, namely the fitting of a target geometry as a circumscribed figure in FIG. 3 a), and the fitting of the target geometry as an inscribed figure in FIG. 3 b). A circular shape was also again selected as the target geometry in FIG. 3 to illustrate the substantive matter.

Figure 3:
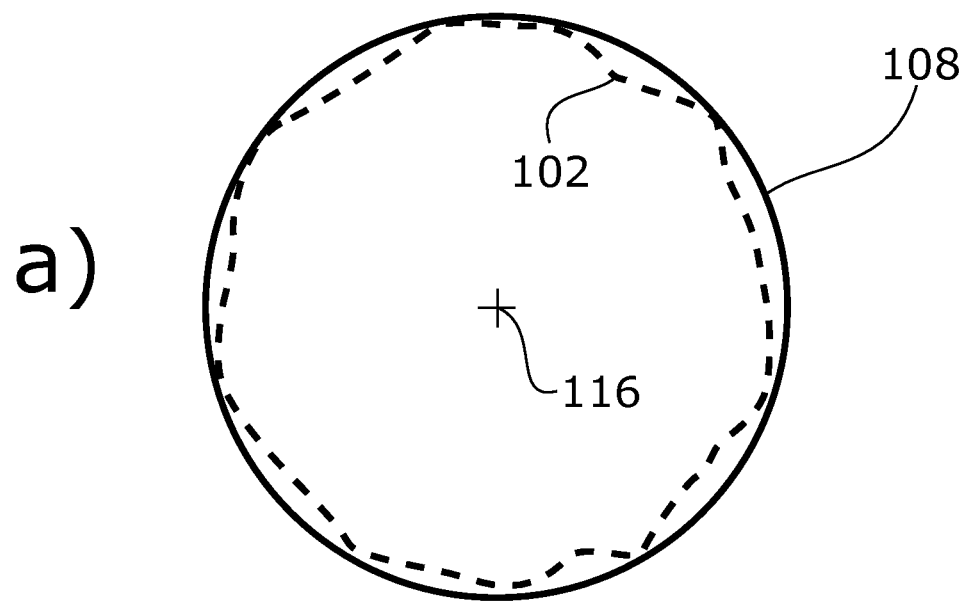
FIG. 3 shows a schematic illustration of a fitted figure and a circumscribed figure.
Figure 3:
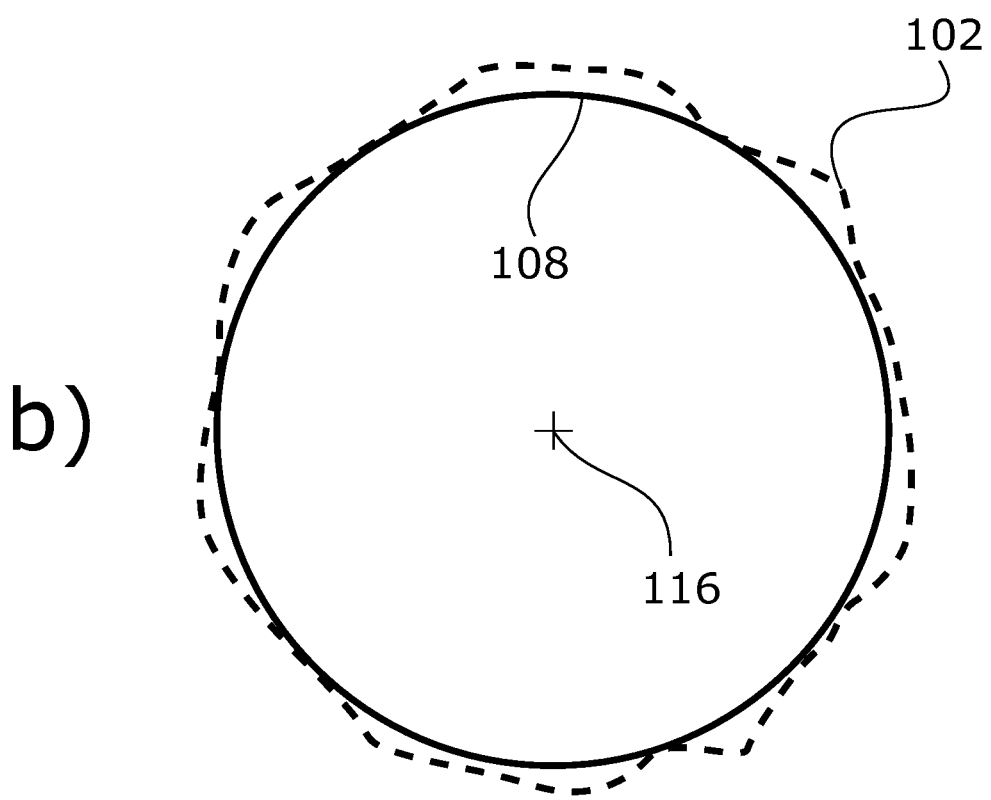

In FIG. 3 a), the target geometry 108 is fitted as a circumscribed figure on the material boundary surface 102. The distance field or the data points 104 of the distance field shown in FIG. 2 are not shown in FIG. 3 for reasons of comprehensibility. As is recognizable in FIG. 3 a), the circumscribed figure is a figure which is arranged so that all points of the material boundary surface 102 are arranged inside the fitted target geometry 108. The fitting of a target geometry 108 as a circumscribed figure can be reasonable, for example, if the geometry which is shown in FIG. 3 a) is, for example, a bolt protruding out of an object. This is because it is relevant in this case which maximum diameter the bolt has, so that it can be decided whether it fits into a corresponding bore or does not.

In contrast, a fitting of a target geometry 108 into a material boundary surface 102 is shown in FIG. 3 b), in which the target geometry 108 is fitted as an inscribed figure into the material boundary surface 102. This means that the target geometry 108 is arranged completely inside the material boundary surface 102. This form of the fitting can be relevant, for example, for analyzing bores or holes in an examined object. This is because in this case the minimum diameter of a bore is relevant to decide whether the bore is suitable for accommodating a corresponding counterpart element. It is to be noted in the comparison of FIGS. 3 a) and 3 b) that due to the selection of an inscribed or circumscribed figure, not only the diameter of the examined geometry determined from the fitted target geometry leads to different results, but also the resulting center point 116 of the fitted target geometry 108 can be different.

Figure 4:
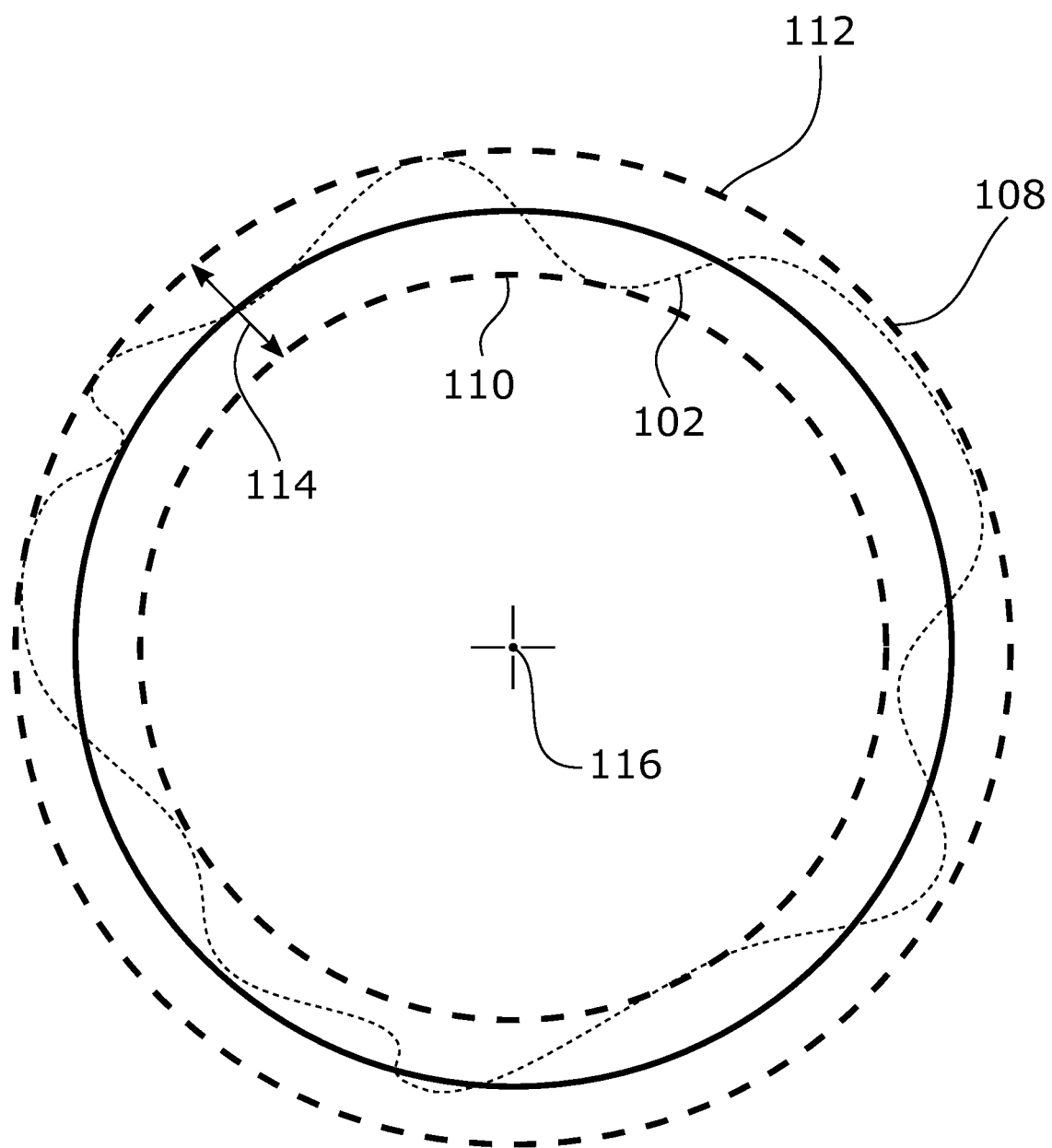
FIG. 4 shows a schematic illustration of a minimum zone fit.

In addition to the above-described variants for fitting a target geometry 108 by means of a root mean square deviation or the fitting of a target geometry 108 as an inscribed or circumscribed figure, as shown in FIG. 4, a fitting of a target geometry 108 can also be performed in the course of a minimum zone fit.

A material boundary surface 102 is shown for this purpose in FIG. 4, which has a geometry deviating significantly more strongly from a circular shape than the material boundary surfaces 102 shown in FIGS. 2 and 3. This geometry was again selected solely for better illustration.

In the case of a minimum zone fit, in general the target geometry 108 is fitted both as an inscribed figure and also as a circumscribed figure in the material boundary surface 102. The corresponding inscribed figure is identified by the reference sign 110, while the circumscribed figure bears the reference sign 112. The position of the target geometry 108 is then ascertained from the inscribed FIG. 110 and the circumscribed FIG. 112 in that the target geometry 108 is positioned accurately in such a way that it has the same spacing 114 to each of the circumscribed FIG. 112 and the inscribed FIG. 110. In this case, the inscribed figure and the circumscribed FIG. 112 are positioned so that the center points 116 thereof are identical.

Figure 5:
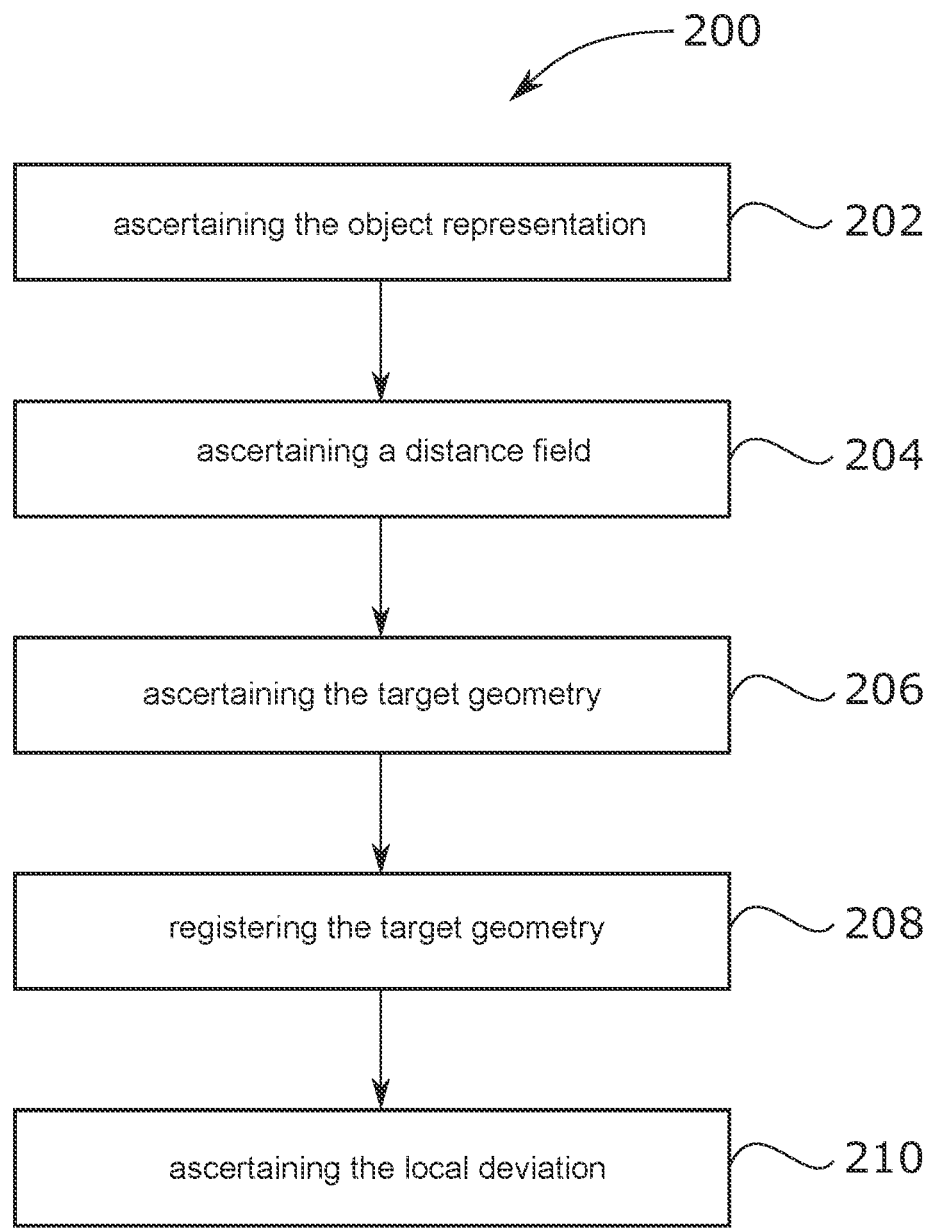
FIG. 5 shows a flow chart of the method according to the invention.

FIG. 5 shows a flow chart 200 of the method according to the invention. In this case, in a first method step 202, the object representation, i.e., the digital representation of the object to be studied, is ascertained. For example, the object representation can be ascertained by a measurement of the object, for example, a computer tomography measurement. Alternatively, the object representation can be read out from a data carrier.

Subsequently, in a following method step 204, a distance field, which comprises a plurality of distance values, is ascertained from the items of image information of the object representation. The distance values assign in this case arbitrary points within the distance field the respective spacing of the point from a closest material boundary surface of the represented object. To ascertain the distance field, it is possible to proceed, for example, from known locations of the material boundary surfaces of the represented object, so that a distance field can be ascertained in a simple manner. The distance field can be both a continuous, scalar field in this case, and also a rastered representation, which contains data points arranged in a grid, to each of which the local distance value at the position of the data point is assigned.

In method step 206, furthermore a target geometry of the object is ascertained, which is to be compared to the actual geometry of the represented object. The ascertainment of the target geometry of the object can be carried out, for example, in that a data carrier is read out, in which an item of information about the actual intended geometry of the represented object is stored. For example, the target geometry can be extracted from a design data set of the object in the form of a CAD file. Furthermore, it is also possible that the target geometry is predetermined by a user input, for example, by the object representation being presented to a user via a display screen, so that the user can assign various target geometries to various regions of the represented object.

In step 208, the ascertained target geometry is registered to the material boundary surfaces of the object specified by the distance values. A registration can take place in various ways in this case. In one simple approach, for example, the corresponding alignment and location of the target geometry in the representation of the object can be concluded from the knowledge of the location of the represented object in an imaging system, for example, a computer tomograph. Furthermore, it is also possible to overlay a target geometry with an actual geometry of a represented object by application of a fit method. It is to be noted in this case that in the course of the fit method, the dimensions of the target geometry are generally not to be changed, since typically not only is a comparison of the shape of the object to take place, but rather also a comparison of the dimensions of the object, as are specified by the target geometry.

In a final method step 210, at various positions of the surface of the target geometry, the respective local value of the distance field is read out, which is representative of a local deviation of the geometry of the represented object in relation to the target geometry registered on the object. A determination of the local deviation of a geometry from a target geometry can thus be carried out in a simple manner with low processing effort. The deviations thus ascertained can be presented to a user, for example, in the form of a false color representation, so that it can be established rapidly, for example, where and to what extent the geometry of a created object, for example, a workpiece, deviates from a desired target geometry.

The invention is not restricted to the above-described embodiments, but rather is modifiable in manifold ways.

All features and advantages originating from the claims, the description, and the drawings, including design details, spatial arrangements, and method steps, can be essential to the invention both per se and also in greatly varying combinations.

LIST OF REFERENCE NUMERALS 102 material boundary surface
104 data point
106 connection vector
108 target geometry
110 inscribed FIG.
112 circumscribed FIG.
114 spacing
116 center point
120 surface point
122 surface point
124 data point
126 data point

The invention claimed is:

1. A computer-implemented method for determining a local deviation of a geometry of an object from a target geometry of the object from a digital representation of the object, wherein the object representation comprises a plurality of items of image information of the object, wherein an item of image information indicates a value of a measured variable for the object at a defined position of the object, wherein the method comprises the following steps:

ascertaining the object representation, ascertaining a distance field from the items of image information of the object representation, wherein the distance field comprises a plurality of distance values, wherein a distance value for a specific point of the distance field specifies the shortest spacing of the point to a closest material boundary surface of the geometry of the object, ascertaining the target geometry of the object, registering the target geometry of the object on the material boundary surfaces of the geometry of the object specified by the distance values, and ascertaining the local deviation of the geometry of the object from the target geometry of the object at a test point on a material boundary surface predetermined by the target geometry by reading out the distance value of the distance field at the position of the test point.

2. The method as claimed in claim 1, characterized in that, to register the target geometry of the object to the material boundary surfaces of the geometry of the object specified by the distance values, the target geometry of the object is fitted into the distance field by application of a fit method.

3. The method as claimed in claim 2, characterized in that the target geometry of the object is fitted into the distance field by application of the method of least squares or a minimum zone fit or by fitting the target geometry as an inscribed or circumscribed figure.

4. The method as claimed in claim 1, characterized in that the distance field comprises a plurality of data points arranged in a grid, wherein the distance field assigns each of the data points at least one distance value for the position of the distance point.

5. The method as claimed in claim 4, characterized in that the raster of the distance field is an orthogonal or isotropic grid.

6. The method as claimed in claim 1, characterized in that the ascertainment of the distance field comprises the following steps:
- ascertaining the location of material boundary surfaces from the items of image information of the object representation,
- ascertaining a respective material boundary surface closest to a data point for the data points of the distance field,
- ascertaining the respective distance of the data points from the respective closest material boundary surface, and
- assigning the respective ascertained spacing to the respective data points as a distance value.

7. The method as claimed in claim 1, characterized in that the target geometry of the object is predetermined by a user input.

8. The method as claimed in claim 1, characterized in that the target geometry of the object is ascertained from a CAD file.

9. The method as claimed in claim 1, characterized in that the target geometry of the object is ascertained from the distance field.

10. The method as claimed in claim 1, characterized in that the object representation is a rastered representation of the object, wherein the rastered representation comprises a plurality of measurement points of a measurement of the object arranged in a raster, wherein a measurement point comprises at least one item of image information.

11. The method as claimed in claim 10, characterized in that the measurement is a computer tomography measurement, wherein the image information of a pixel indicates the x-ray density of the material of the object at the point of the pixel.

12. A computer program product stored in a non-transitory medium having instructions executable on a computer, which instructions, when executed on a computer, cause the computer to carry out the method as claimed in claim 1.

* * * * *